United States Patent [19]

Hashimoto et al.

[11] Patent Number: 5,221,963
[45] Date of Patent: Jun. 22, 1993

[54] VIDEO CAMERA HAVING A VIDEO SIGNAL PROCESSING APPARATUS

[75] Inventors: Nobuo Hashimoto, Ashiya; Hiroaki Kubo, Nagaokakyo; Yuuichi Kunisaki; Yoshito Konishi, both of Takatsuki, all of Japan

[73] Assignee: Minolta Camera Kabushiki Kaisha, Osaka, Japan

[21] Appl. No.: 677,140

[22] Filed: Mar. 29, 1991

[30] Foreign Application Priority Data

| Mar. 31, 1990 | [JP] | Japan | 2-87216 |
| Mar. 31, 1990 | [JP] | Japan | 2-87217 |
| Mar. 31, 1990 | [JP] | Japan | 2-87218 |
| Mar. 31, 1990 | [JP] | Japan | 2-87219 |
| Apr. 3, 1990 | [JP] | Japan | 2-89729 |

[51] Int. Cl.⁵ .......................... H04N 5/30; H04N 5/213
[52] U.S. Cl. ..................... 358/209; 358/169; 358/167
[58] Field of Search ............... 358/171, 34, 174, 167, 358/170, 169, 209

[56] References Cited

U.S. PATENT DOCUMENTS

| 4,470,067 | 9/1984 | Mino | 358/169 |
| 4,654,710 | 3/1987 | Richard | 358/39 |
| 4,745,464 | 5/1988 | Gronau et al. | 358/34 |
| 4,811,101 | 3/1989 | Yagi | 358/171 |
| 4,821,100 | 4/1989 | Yamamoto | 358/27 |
| 4,862,270 | 8/1989 | Nishio | 358/160 |
| 5,023,649 | 6/1991 | Hayashi et al. | 354/434 |

FOREIGN PATENT DOCUMENTS

| 62-110369 | 5/1987 | Japan . |
| 62-203486 | 9/1987 | Japan . |
| 64-25270 | 2/1989 | Japan . |

Primary Examiner—Michael T. Razavi
Assistant Examiner—Wendy R. Greening
Attorney, Agent, or Firm—Willian Brinks Olds Hofer Gilson & Lione

[57] ABSTRACT

A video camera comprising a taking lens, an image taking circuit which generates a video signal by receiving a light having passed through the taking lens, a knee correction circuit which compresses a video signal generated by the image taking circuit and having a level as high as or higher than a predetermined level, a detection circuit which detects a luminance distribution condition of a field, a pedestal adjusting circuit which adjusts a black level of the video signal generated by the image taking circuit and a control circuit which changes a compression method of a video signal in the knee correction circuit and an adjusting method of the black level in the pedestal adjusting circuit according to a luminance distribution condition of a field detected by the detection circuit. According to the present invention, it is possible to perform various controls in response to a luminance condition of a field.

15 Claims, 14 Drawing Sheets

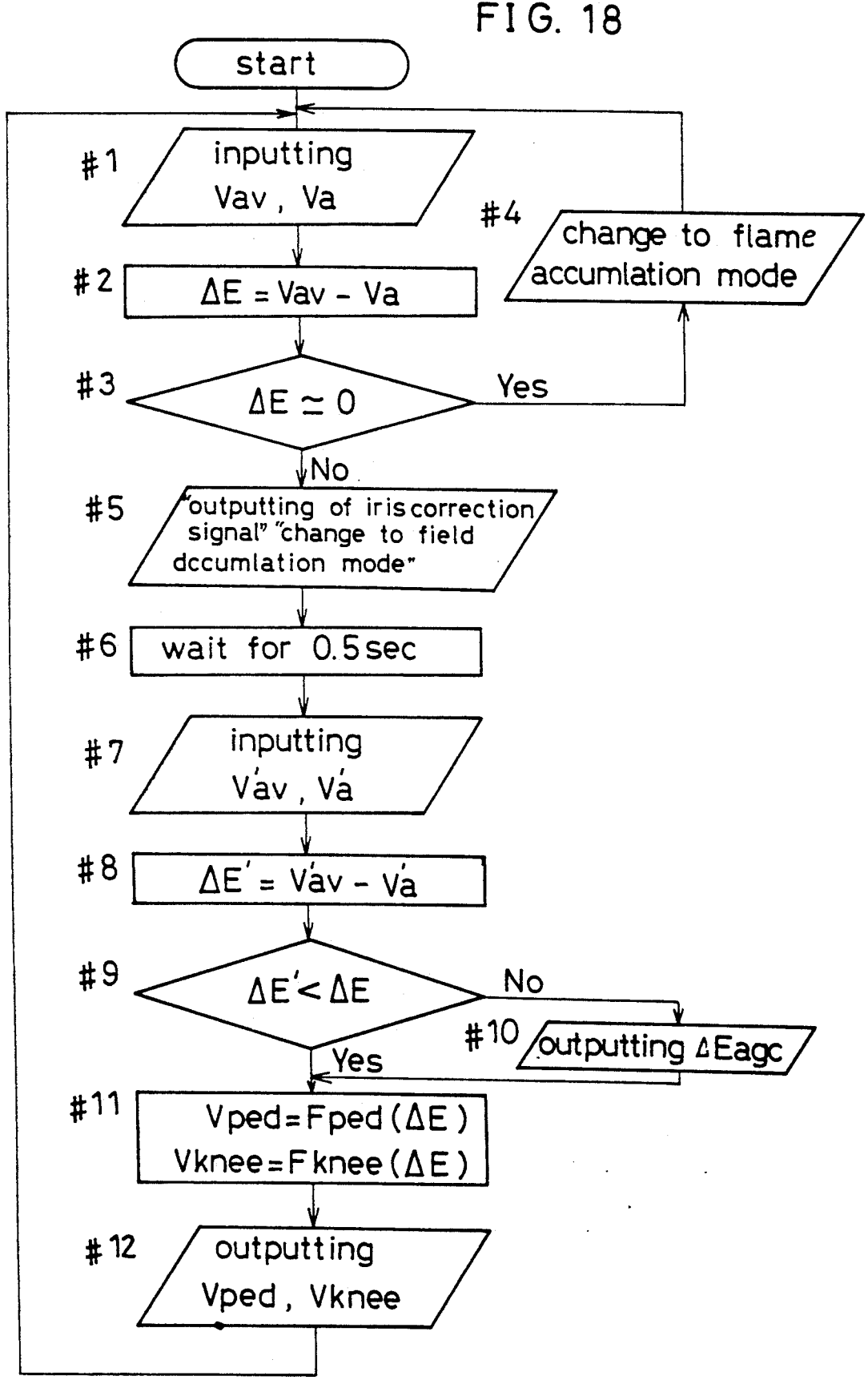

VIDEO CAMERA HAVING A VIDEO SIGNAL PROCESSING APPARATUS

BACKGROUND OF THE INVENTION

1. Field of the Invention

The present invention relates to a video camera. More specifically, the present invention relates to a video camera which performs various controls according to a luminance condition of a field.

2. Description of the Prior Art

FIG. 1 is a block diagram of a prior art.

In FIG. 1, 1 is a taking lens system. 2 is an infrared ray cut filter, which cuts infrared ray that cannot be seen by the human eye, causes a noise, and interferes with a photographing. 3 is an iris. 4 and 5 are color separation prisms; 4 leads only green light to a G-charge coupled device (hereinafter charge coupled device will be referred to as CCD)6, and 5 leads mazenta light having passed through the prism 4 to a R/B-CCD7. The light having passed through the prism 4 enters the G-CCD6; a luminance signal of the green light is detected by the entire picture elements of the G-CCD6 which outputs a signal G relating to the entered green light. The light having passed through the prism 5 enters the R/B-CCD7, which detects red light and blue light with a corresponding picture element, respectively, and outputs signals R and B relating to the entered red and blue light as separate signals. The signals of G, R, and B detected by CCDs 6 and 7 are converted into video signals after the noises are reduced by a well-known correlation double sampling (hereinafter referred to as CDS) circuit 8, respectively. After the noises are further reduced at a low pass filter (hereinafter referred to as LPF) circuit 9, the video signals of G, R, and B are amplified to an appropriate intensity at an auto gain control (hereinafter referred as AGC) circuit 10, and are clamped to a predetermined level in a clamp circuit 11. 12 is a white balance circuit, which adjusts white balance in response to a color temperature by adjusting the gain of R and B channel.

13 is a pedestal adjusting circuit, which maintains a black level of the video signals at a predetermined level (blanking level), to be more specific, adds a bias voltage to an input signal so that an output signal becomes zero when an input signal becomes zero.

A gamma correction circuit 14 corrects a gamma value in accordance with the characteristics of a TV receiver. A knee correction circuit 15 has input/output characteristics shown with a solid line in FIG. 13.

16 is a matrix circuit, which generates a luminance signal Y and color difference signals R-Y and B-Y from the R, G, and B signals. Thereafter, the color difference signals R-Y and B-Y are balanced-modulated in a modulation circuit 17, and then they are added to each other at an adder 50, and thereafter a color burst signal is added to them at an adder 51 to form a chrominance signal. Then, at an adder 53, they are added to a luminance signal Y to which a synchronizing signal has been added at an adder 52, and are outputted as composite video signals.

18 is a non additive mixing (hereinafter referred to as NAM) circuit as shown in FIG. 3, which inputs the signals of each of R, B, and G channels of the CDS circuit 8 and outputs only a signal having a maximum value of the R, B, and G signals.

41 is a detection circuit which smoothes a signal outputted by the NAM circuit 18.

An iris driving circuit 21 controls the iris 3 so that the level of a signal detected by the detection circuit 41 becomes constant.

When a rearlight correction switch 40 is closed, a predetermined value is added to the outputs of the detection circuit 41 at the adder 29. Therefore, in this case, the iris 3 is opened wider than when the control is performed based on only the output of the detection circuit 41, so that the taken image of the main subject against the light becomes brighter.

To improve the reproducibility of a luminance, a knee correction circuit 15 compresses a luminance difference of a wide dynamic range into that of a narrow dynamic range which can be reproduced on a TV screen. The compression is performed by compressing a gradation of a high luminance area. Since the obtained luminance difference of a video signal differs according to the luminance distribution condition of a field, it is preferable to change the compression method according to the luminance distribution condition. However, in the gradation compression method of the conventional knee correction circuit 15, for example, as shown by a solid line in FIG. 13, the range with an input signal intensity of 100% to 300% is set to be compressed into a range with an output signal intensity of 100% to 120%. In addition, the gradation compression starting point and the compression rate are fixed, respectively. However, since the luminance difference between a main subject and the background largely differs according to a field condition, with only one compression method, it is difficult to correct a reproduction gradation and therefore the reproduction gradation deteriorates. Especially, in a shooting of a scene including a main subject against the light or a main subject illuminated against the dark, for example, a person directed a spotlight, the above problem is arisen. There is another well-known gradation compression method in which a gradation compression starting point decreases as a peak value of a video signal increases. However, this method also cannot cope with a shooting of a scene including a main subject against the light or a main subject illuminated against the dark since the gradation compression is not changed according to a luminance distribution condition of the field.

Since the iris 3 is closed in by the iris driving circuit 21 when the average luminance of the field is high, a main subject becomes black in a shooting of a scene including the main subject against the light due to an insufficient exposure. To prevent this, the iris 3 is adjusted based on the main subject in a shooting of a scene including the main subject against the light. Even in this case, the light from the background intrudes into the main subject because of a light reflection on a lens surface, etc. and the subject becomes whitish, so that the image becomes less clear. For example, as shown in FIG. 11A, when a black subject is shot against the light, the center of the image plane where a main subject is situated becomes black and its surroundings where the background is situated becomes bright. However, since an internal reflection of an optical system causes a flare to increase a luminance of a subject image, the luminance level of the subject is increased by the flare, as shown in FIG. 11C, by the amount Vf more than the actual luminance level (black level) Vd shown in FIG. 11B. In correcting such a phenomenon, an excellent reproducibility of an image cannot be attained only by opening the iris 3 according to a luminance of a main subject.

The iris driving method comprising an average detection by the detection circuit 41 is directed to a control by which the average brightness of an entire image plane becomes an optimal luminance. In other words, the iris 3 is controlled so that a detection voltage of an image plane where the total area of high light parts is the same as that of black parts becomes a predetermined reference value. However, according to this method, an output of the image sensor (CCD) is apt to decrease, for example, in shooting an image plane of single color. As a result, the Signal to Noise (hereinafter referred to as S/N) ratio deteriorates. Another iris driving method is to use a peak detection. In this method, the output of the image sensor relating to an image of single color can be increased. However, since the iris 3 is controlled according to a maximum peak value regardless of the size of the area having a peak level, even when a high luminance part is in a small area, the iris is controlled according to a luminance level of the high luminance part in the small area. Consequently, the signal level in the wide area becomes low and therefore the entire image plane becomes dark, which deteriorates the S/N ratio.

A video camera usually shoots a frame of an image plane at every 1/30th of a second. To prevent flickers on a TV screen, an image plane for one frame is interlace-scanned: the image plane is divided into two image planes (fields), each field is scanned in 1/60 second, and a frame of a complete image plane is composed of two fields. When a CCD is employed as an image sensor, there are two methods, that is, a field accumulation mode and a frame accumulation mode, to obtain a video signal constituting the two fields. In the frame accumulation mode, the image of A and B fields are alternately shot. Here, A field is defined as a field consisting of odd scanning lines and B field is defined as a field consisting of even scanning lines. In a field accumulation mode, a field is constituted by combining two vertically adjoining image element signals into one image element signal. The images of the A field and the B field are alternatively shot by differentiating the combination of the adjoining picture elements by vertically shifting them as shown in FIG. 17 so that the images of the A and B fields obtain the same effect as the effect that of the image obtained by an interlace scanning. In the field accumulation mode, since the output signal of each image element is derived for 1/60 second, the light charge accumulation time is half that of the frame accumulation mode. Consequently, a dynamic range can be doubled.

However, in a place where there is only a little incident light, since the accumulation time is short, the S/N ratio is inferior to that of the frame accumulation mode, and the image quality deteriorates. In addition, since the output of each image element in response to the same quantity of the incident light is half that of the frame accumulation mode, the outputs of two vertically adjoining picture elements is combined to obtain a video signal having the same level as that of the frame accumulation mode. Consequently, a vertical resolving power decreases. On the contrary, in the frame accumulation mode, since a horizontal scanning line on an image plane is composed of an output of a picture element line in a horizontal line of a CCD, a vertical resolving power is superior to that of the field accumulation mode. However, since the light charge accumulation time is twice that of the field accumulation mode as described above, a subject luminance at which an accumulation electric charge starts to overflow is half that of the field accumulation mode, so that the dynamic range becomes narrow. Consequently, when a luminance difference is small, for example when a shooting is performed in a lighting from the front or in a room, by using the frame accumulation mode, an image signal with an excellent reproducibility is obtained. When a luminance difference is large, for example when a shooting is performed against the light, outdoors where there is a shade, or indoors where the background includes an outdoor view (high luminance part), by using the field accumulation mode, an image signal with an excellent reproducibility is obtained.

However, conventionally, the above-described mode selection has not been adopted; a shooting mode has been fixed in each type of a video camera, respectively.

In a video camera, to obtain a clear image plane, the brightness of an entire image plane is so controlled as to be maintained at a predetermined level by an iris and an AGC circuit, etc. That is, a signal with the greatest intensity of the video signals R, B, and G is selected at a NAM circuit 18, and then the selected signal is smoothed at a detection circuit 41. By the smoothed signal, the iris 3 is controlled through the iris driving circuit 21 so that the smoothed signal maintains a fixed intensity. However, such control method has a disadvantage that a main subject becomes dark under a shooting against the light because the background (high luminance part) largely affects the brightness of a projected image. Moreover, if the rearlight condition is corrected by only an amplification control of the AGC circuit, the CCD operates at a low level with respect to a subject against the light. Consequently, the S/N ratio with respect to a main subject deteriorates because an operation level of the CCD is not controlled by the iris 3, even if the CCD could be operated at a sufficiently high level with the iris opened to its opened end.

SUMMARY OF THE INVENTION

A first object of the present invention is to provide a video camera which overcomes a problem that an image of a high luminance part of the background at a shooting of a scene including a main subject against light or and an image of a main subject at a shooting of a scene including a main subject illuminated against the dark becomes unclearly whitish by changing a gradation compression method according to a luminance distribution condition of a field.

A second object of the present invention is to provide a video camera which can improve a reproducibility of a black level in a field, especially in a shooting of a scene including a main subject against the light, by effecting a flare correction in accordance with a luminance distribution condition of a field.

A third object of the present invention is to provide a video camera which can control an iris so that a projected image with an excellent signal to noise ratio is obtained regardless of a contrast ratio in a field.

A fourth object of the present invention is to provide a camera in which a dynamic range becomes wide when a luminance difference is large and a signal to noise ratio is improved when a luminance difference is small by making the mode changeable between a frame accumulation mode and a field accumulation mode according to a luminance distribution condition of a field.

A fifth object of the present invention is to provide a video camera which can excellently reproduce an image of a subject at a shooting of a scene including a main subject against light where a luminance difference is large, by increasing a gain of an amplifier which amplifies a video signal in a case where a main subject is dark though an iris is opened to its opened end.

BRIEF DESCRIPTION OF THE DRAWINGS

These and other objects and features of this invention will become clear from the following description taken in conjunction with the preferred embodiments with reference to the accompanied drawings in which:

FIG. 18 is a flow chart of an operation of a calculation circuit.

DETAILED DESCRIPTION OF THE PREFERRED EMBODIMENTS

Figure 1:
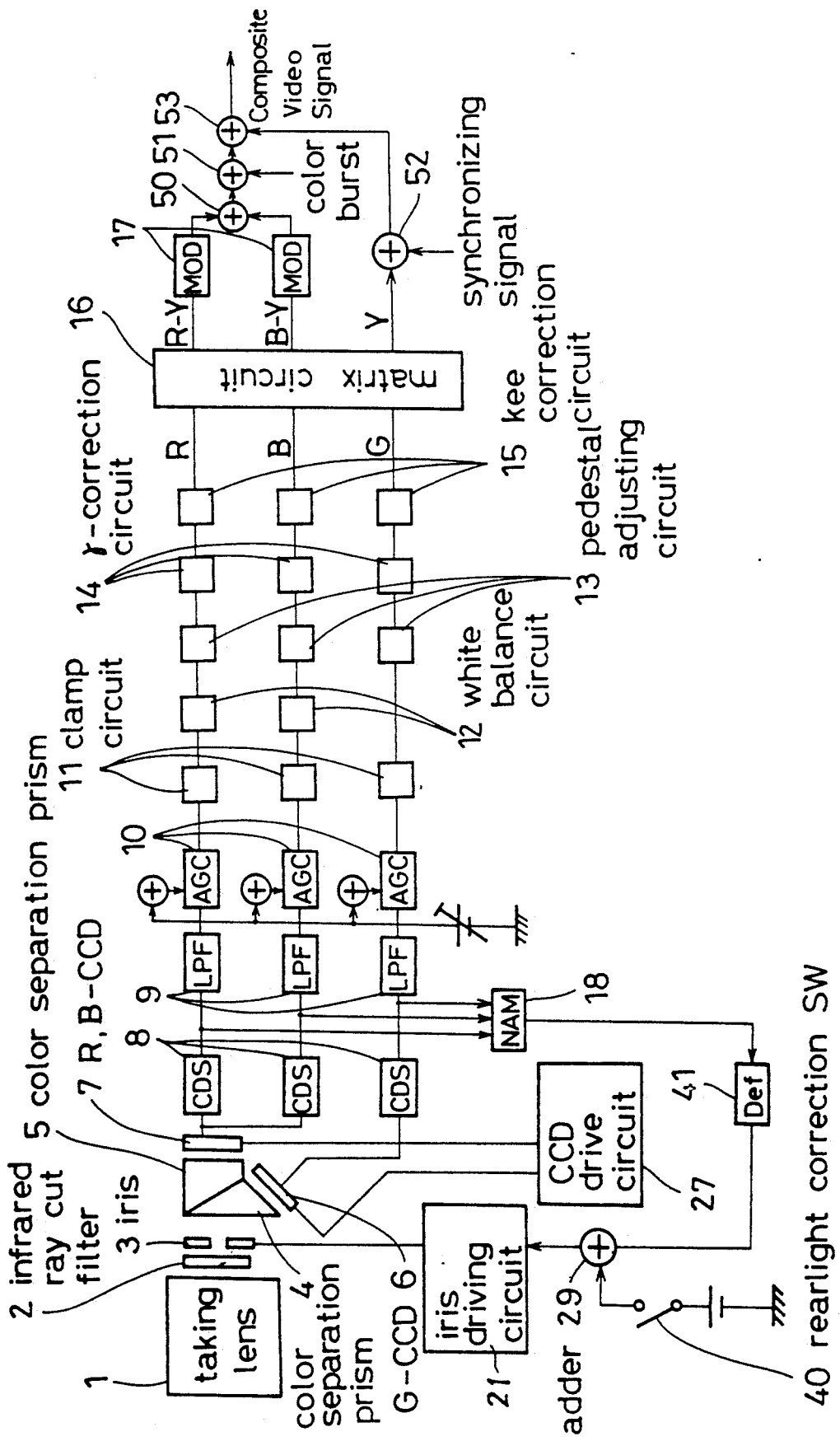
FIG. 1 is a diagram showing an arrangement of a prior art.
Figure 2:
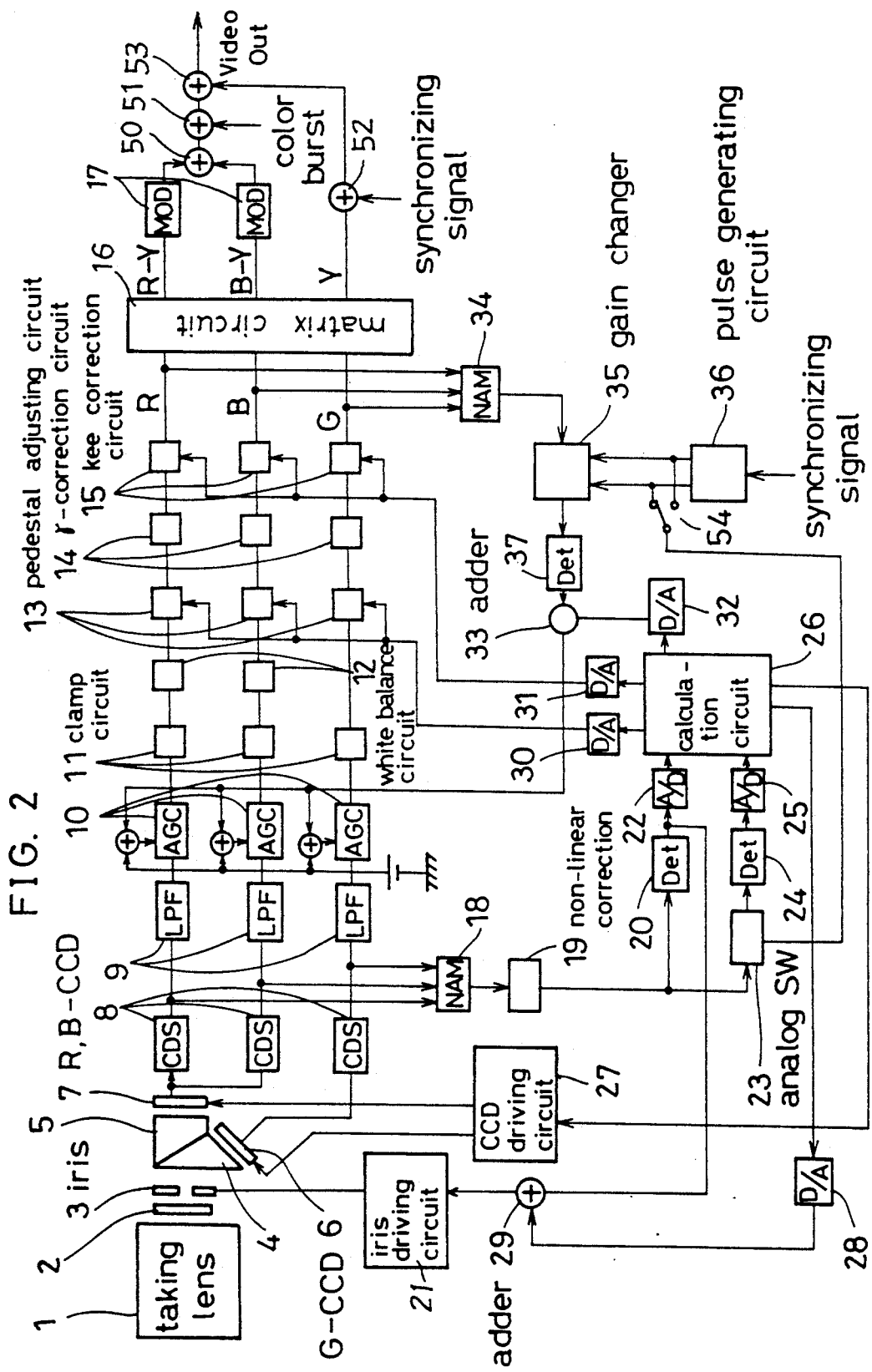
FIG. 2 is a diagram showing an arrangement of an embodiment of the present invention.

Some portions of an implementation of FIG. 2 are designated by the same reference by which they are identified in FIG. 1.

Figure 4:
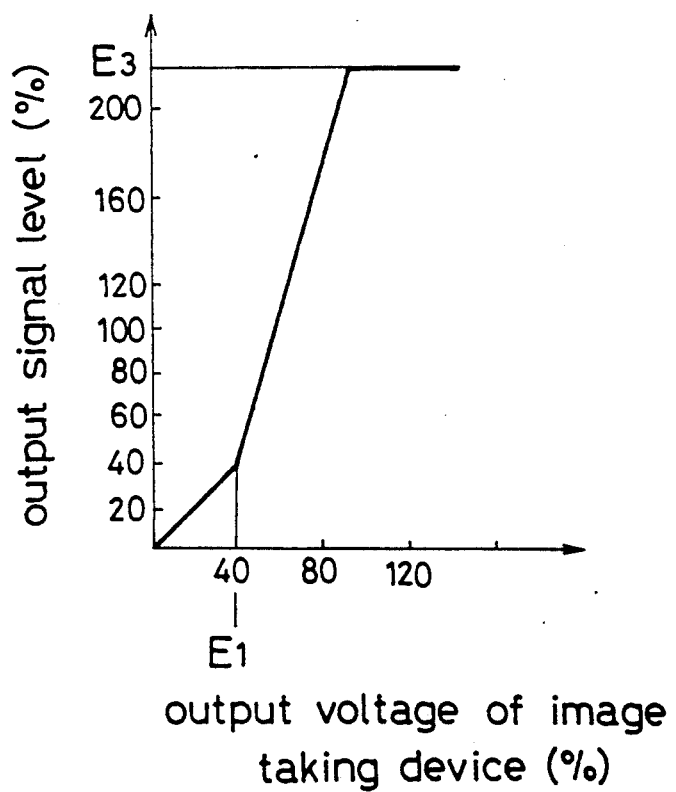
FIG. 4 shows a characteristic curve of a non-linear correction circuit employed in a video camera.
Figure 5:
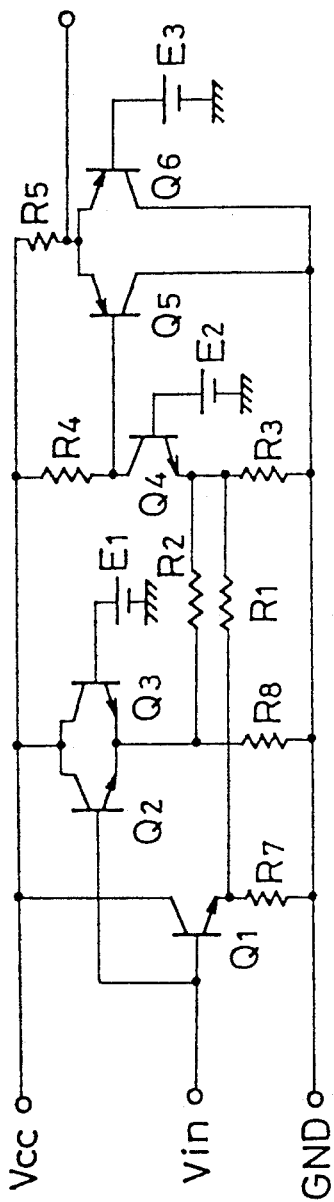
FIG. 5 is a diagram of the non-linear correction circuit employed in the video camera of the present invention.

In FIG. 2, 19 is a non-linear correction circuit which non-linearly corrects an output signal of the NAM circuit 18. The non-linear correction circuit 19 has an input/output characteristics shown in FIG. 4. The circuit 19 amplifies an input signal having a luminance level within a predetermined level range (40-90) at a high amplification to intensify a high light part of the taken image. It clips a signal having a level higher than the predetermined level range to restrain a maximum value of the output signal intensity to a fixed value. An embodiment of the non-linear circuit 19 is shown in FIG. 5. (The details are described later.)

A detection circuit 20 detects an output signal of the non-linear correction circuit 19 and average it with an integrating circuit having a time constant of approximately one second and outputs an average detection voltage Vav corresponding to an entire part of a taken image plane. The average detection voltage Vav is sent to the iris driving circuit 21 by which the iris 3 is controlled so that the average detection voltage Vav becomes close to a predetermined value.

22 is an analog to digital (hereinafter referred to as A/D) converter, which converts an analog signal of the average detection voltage Vav into a digital signal and supplies them to a calculation circuit 26.

23 is an analog switch which is controlled by a control signal generated by an pulse generating circuit 36 to transmit only a signal corresponding to the lower center of the taken image plane among the output signal of the non-linear correction circuit 19.

An detection circuit 24 detects an output signal of the non-linear correction circuit 19 supplied through the analog switch 23 and averages it with an integrating circuit to output an average detection voltage Va corresponding to the lower center of the image plane. An A/D converter 25 converts the average detection voltage Va and supplies it to a calculation circuit 26.

The calculation circuit 26 outputs an iris correction signal to a digital to analog (hereinafter referred to as D/A) converter 28 for a rearlight correction (i.e. correction to compensate a taking condition under a rearlight) obtained from the difference ($\Delta E$) between the above average detection voltages Vav and Va; an AGC correction signal to a D/A converter 32; a correction signal for the pedestal adjusting circuit 13 to a D/A converter 30; and a correction signal for the knee correction circuit 15 to a D/A converter 31. The detailed description of these correction signals will be given later.

Figure 7:
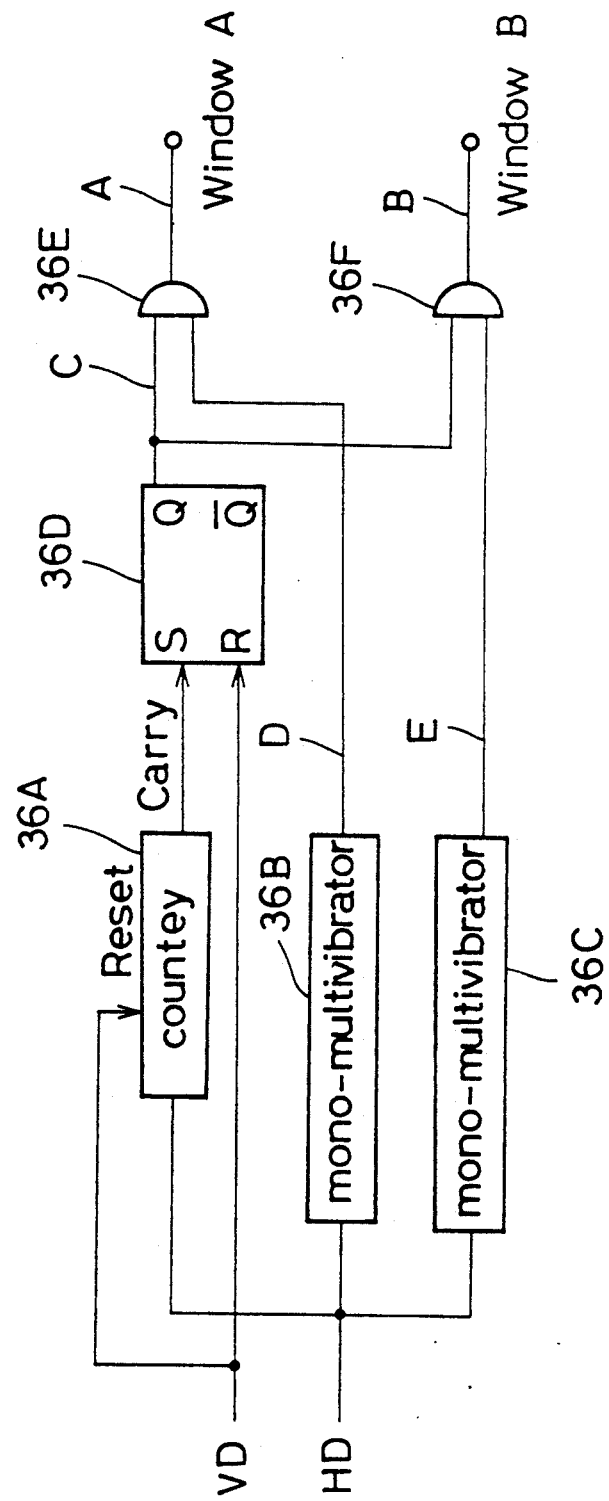
FIG. 7 is a block diagram showing an arrangement of a pulse generating circuit constructed in the video camera of the present invention.
Figure 8:
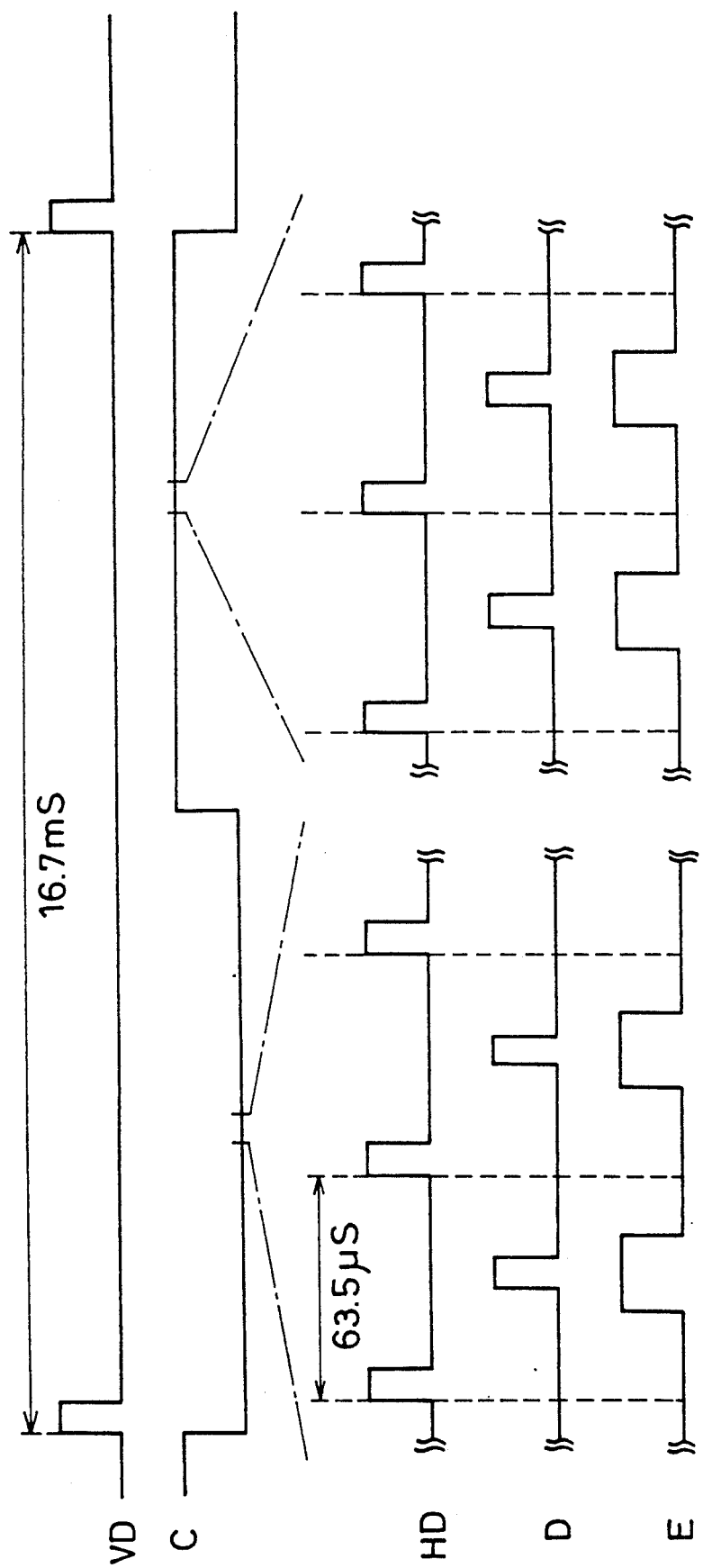
FIG. 8 shows signals in the pulse generating circuit.
Figure 9:
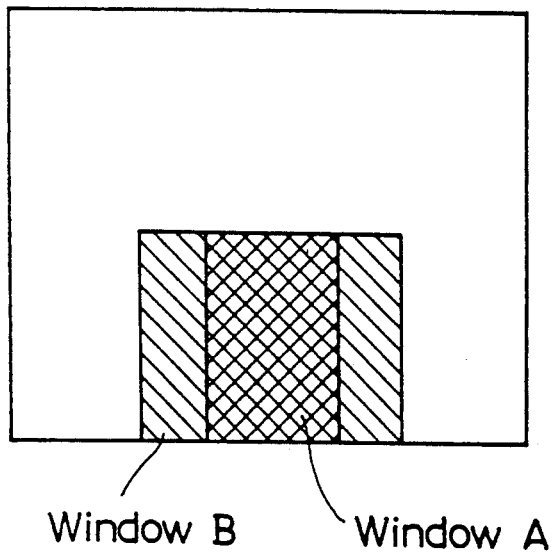
FIG. 9 shows a window where a main subject is situated in a image plane.

36 is a pulse generating circuit, whose embodiment is shown is FIG. 7. Signals of the embodiment are represented in FIG. 8. In FIG. 7, a counter 36A counts a horizontal synchronizing signal HD and reverses a flip flop 36D with a carry signal at a predetermined count number to make the level of an output signal C "H" level. Responding to an enter of a vertical synchronizing signal VD, the counter 36A and the flip flop 36D are reset and thereby the level of the output signal C becomes "L", so that a control signal C which synchronizes with a vertical synchronizing signal VD is generated as shown in FIG. 8. A mono-stable-multivibrator 36B synchronizes with the horizontal synchronizing signal HD. A control signal D having "H" level is generated in the center of the interval between the pulses. A mono-stable-multivibrator 36C synchronizes the horizontal synchronizing signal HD. A control signal E is generated between the pulses which is wider than the control signal E in a pulse width and coincides with it in the center point of the pulse. An adder 36E logically adds the control signal C to the control signal D, and thereby generates a control signal A corresponding to a window A (see FIG. 9) which becomes "H" level when the signals C and D are "H" level. An adder 36F logically adds the control signal C to the control signal E, and thereby generates a control signal B corresponding to a window B (see FIG. 9) which becomes "H" level when the signals C and E are "H" level.

The control signal A (B), which is sent to the analog switch 23 through a selection setting switch 54, turns on the analog switch 23 when the control signal A (B) is "H" level and transmits an output signal of the non-linear correction circuit 19 corresponding to the range of the window A (B). A user chooses the window A or the window B to be supplied to the analog switch 23 by manually operating the switch 54 in consideration of the subject. Therefore, the selected window A or B defines the lower center of an image plane.

34 is a NAM circuit of the same type as 18, which inputs the signals of R, B, and G corrected by the knee correction circuit 15 and selects a signal of a maximum value of the R, B, and G signals. 35 is a gain changer, which judges whether an input signal supplied from the NAM circuit 34 exists in the window A or the window B. The gain of the AGC circuit 10 is set to be larger in the window A portion than in the window B portion by the gain changer 35. The gain of the AGC circuit 10 is thus weighted differentially with respect to the window A and B portions (window A > window B in weight). 37 is a detection circuit, which detects a video signal amplified and outputted by the gain changer 35. The detected signal controls a gain of the AGC circuit 10.

The features of the present invention will hereinafter be explained in detail.

Firstly, the pedestal adjusting circuit 13 will be explained. The pedestal adjusting circuit 13 amplifies a video signal obtained by the image taking device, after a black clamp by the clamp circuit 11 and a white balance adjustment by the white balance circuit 12.

Figure 3:
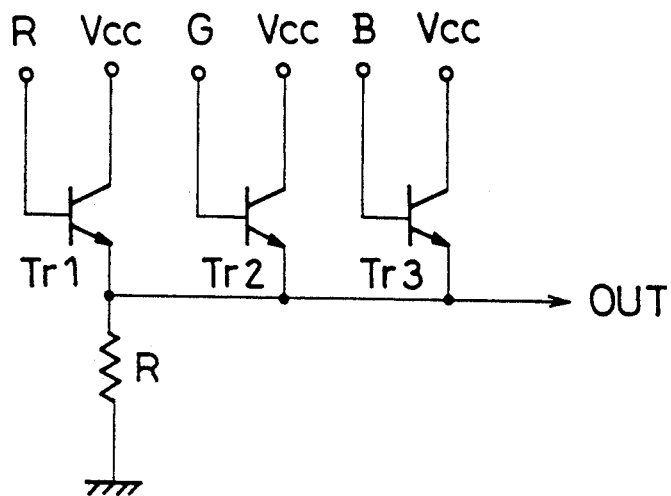
FIG. 3 is a circuit diagram of a NAM circuit.
Figure 10:
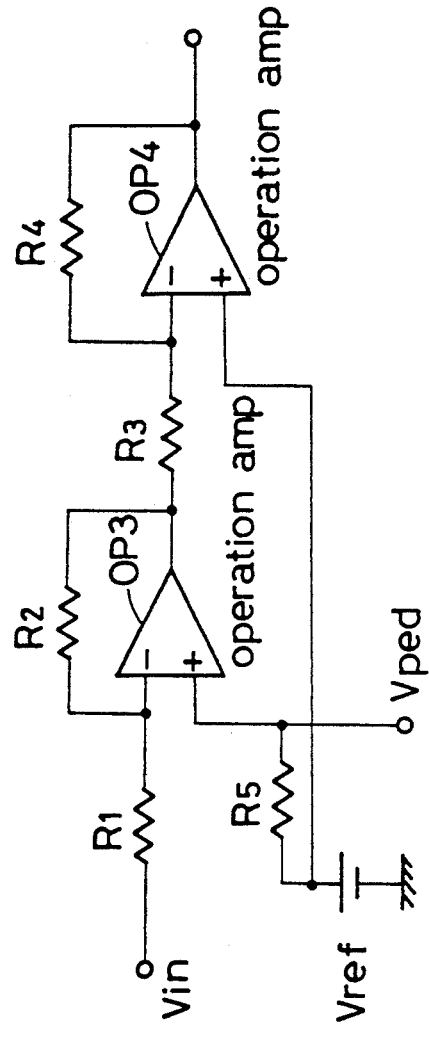
FIG. 10 is a circuit diagram of a pedestal adjusting circuit incorporated in the video camera.

FIG. 10 shows an example of the pedestal adjusting circuit 13. In FIG. 10, 3 and 4 are operation amplifiers. This circuit adjusts the zero point of an input video signal by inputting a control voltage Vped from outside into a reference voltage Vref. Normally, the zero point is adjusted in the production process of a video camera so that a black level of a video signal equals a blanking level, and is fixed after that. In the present invention, the black level in rearlight condition is corrected by changing the Vped according to a rearlight condition.

Figure 11C:
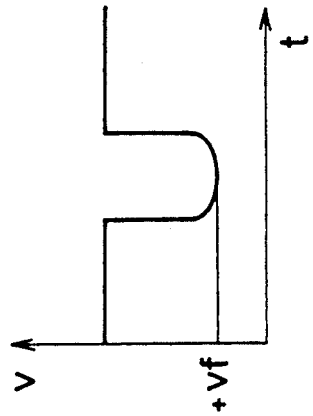
FIGS. 11(A), 11(B), and 11(C) are views explaining a change of a signal by a flare.
Figure 11B:
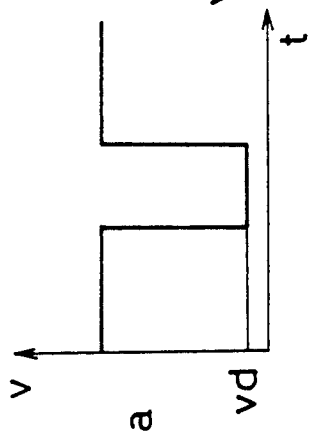
Figure 11A:
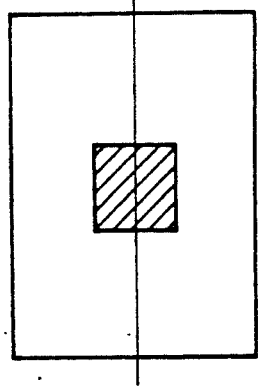

The necessity of a black level correction in the rearlight as well as the principle of the correction will be explained now with reference to FIG. 11. For example, when a main subject which is black is shot against the light as shown in FIG. 11A, the center of the image plane where the main subject is should be black. However, a flare is generated because of an internal reflection of the optical system, so that the luminance of the main subject increases. That is the luminance level of the subject becomes greater than the actual luminance level Vd (black level) shown in FIG. 11B by Vf, as shown in FIG. 11C, by the flare. At this time, in the pedestal adjusting circuit, the direct current signals in the main subject portion increased by the flare can be reduced setting a black level of a video signal to be coincident with a blanking level at a level higher than the normal black level, so that the reproduced image becomes clearer. This is the principle of the pedestal adjusting system according to the present invention. In this case, on the reproduced image, the video signal level is decreased as a whole; however, the background does not become dark since it is extremely bright from the beginning, and a relationship is maintained on the image plane that a main subject exists against a bright background.

The Vped used for a correction of a black level is outputted by the calculation circuit 26. In the calculation circuit 26, the Vped is calculated based on a function Fped ($\Delta E$) whose variable is the difference $\Delta E$ between the average detection voltage Vav of the video signal corresponding to the entire image plane and the average detection voltage Va of the video signal corresponding to the lower center of the image plane, and the calculation result is analogized at the D/A converter 30. The added voltage Vped is given by Vped = Fped ($\Delta E$). When Vped is added to the reference voltage Vref of the pedestal adjusting circuit 13, the reference voltage increases by the amount of Vped; therefore, the output voltage (pedestal level) of the pedestal adjusting circuit 13 increases by the amount of the added voltage Vped. This means that a luminance level equivalently decreases by the amount of Vped. The Vped corresponds to a component of black level increased by the flare.

In this embodiment, as described above, an average luminance signal of an entire image plane and the lower center of the image plane are detected, and a black level is corrected according to the difference of the above two luminance signals. Since a main subject is generally situated in a territory from the center to the lower parts of an image plane, the difference between the brightness of main subject and the background is equivalent to the reference for the adjusting. Therefore, in the present invention, a black signal level is adjusted with reference to the luminance difference between a main subject and the background, and a balanced image is always obtainable.

Another method is considered in which the luminance difference between the brightest and the darkest parts of the image plane is detected to generate an adjusting signal. However, since the brightest and the darkest parts are not always included in an important part of an image plane, when a black signal level is adjusted with reference to a luminance difference as described above, it can happen that the black level is decided with reference to the parts other than a main subject and thereby a main subject becomes darker than a required brightness. And therefore sometimes, an image of a main subject of an image plane is not excellently reproduced; however, this does not mean that the method is not adaptable as an evaluation method of a luminance difference.

Figure 12:
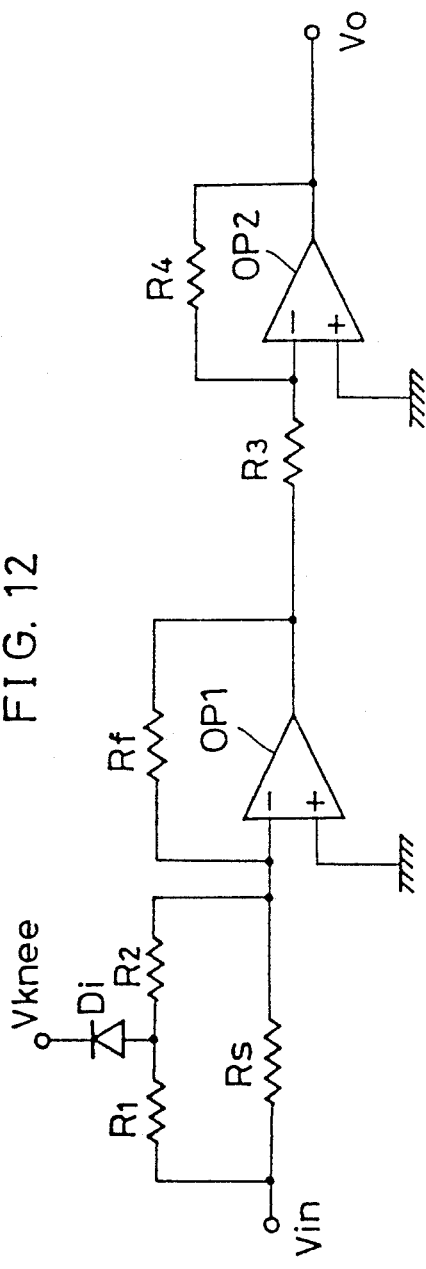
FIG. 12 is a diagram of a knee correction circuit.

Next, the knee correction circuit 15 will be explained. A circuit arrangement of the knee correction circuit 15 according to the present invention is shown in FIG. 12. In FIG. 12, Vin is an input voltage, Vknee is a knee correction starting voltage and Vo is an output voltage. Since a diode Di connected to an operation amplifier OP1 is imaginary short, the diode Di is maintained off when the input voltage Vin is low level and an amplification Alo of the operation amplifier OP1 equals $-Rf(R1+R2+Rs)/Rs(R1+R2)$. The voltage between the both ends of the diode Di is zero when the input voltage Vin equals $[(R1+R2)/R2]Vknee$. When an input voltage Vin is greater than $[(R1+R2)/R2]V$kee, the diode Di is turned on, and the amplification A1 equals $-Rf/Rs$. An operation amplifier OP2 is a reversing amplifier of a gain $A2 = R4/R3$. Therefore, when $Vin < [(R1 + R2)/R2] \times Vknee$,
$Vo = [1/(R1 + R2) + 1/Rs] \times Rf \times (R4/R3) \times Vin$
$= k_1 \times Vin$ ($k_1$ is a constant)

when $Vin \geq [(R1 + R2)/R2] \times Vknee$,
$Vo = (Rf/Rs) \times (R4/R3) \times Vin$
$= k_2 \times Vin$ ($k_2$ is a constant, and $k_1 > K_2$).

Figure 13:
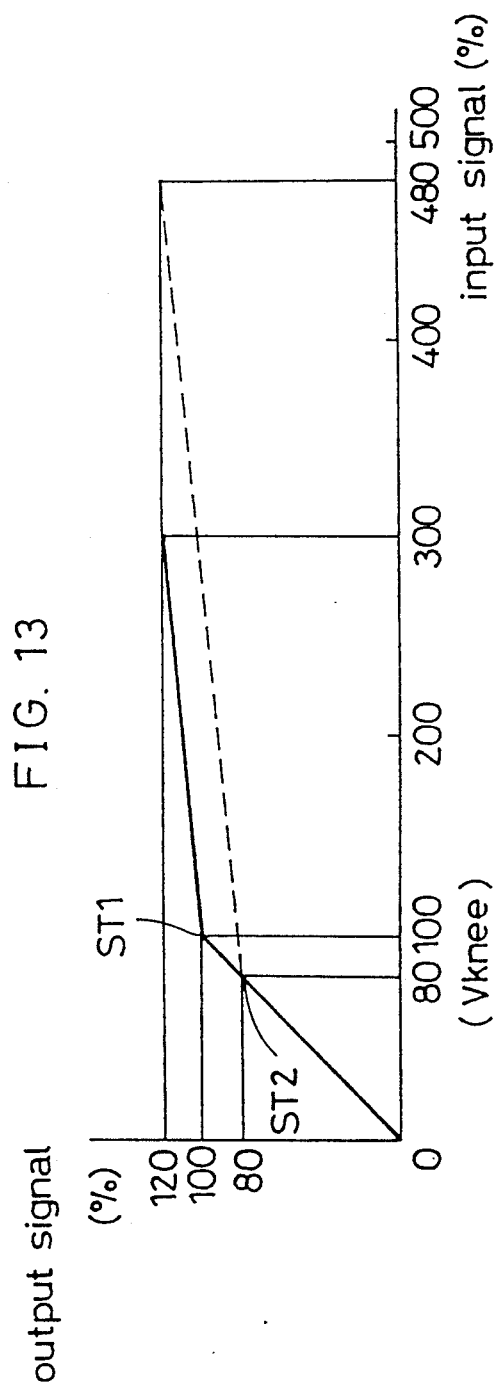
FIG. 13 is a characteristic curve of the knee correction circuit.

The knee correction circuit 15 as described above, which has the input/output characteristics as shown in FIG. 13, compresses a gradation of a high luminance part. In this embodiment, the knee correction starting voltage Vknee is calculated by the calculation circuit 26 with an average luminance signal of an entire image plane and the lower center of the image plane. That is, when the voltage difference between an average luminance signal of an entire image plane and that of the lower center (the window A or the window B) of the image plane is ΔE, the Knee correction starting voltage Vknee is obtained as Vknee=Fknee (ΔE) by a predetermined function Fknee. The knee correction starting voltage Vknee obtained by this calculation is analogized at the D/A circuit 31 and is supplied to the knee correction circuit 15 to perform a gradation compression correction. In shooting a main subject against light or illuminated with light the luminance difference between the main subject and the background is large, and therefore a gradation compression is started at a lower input level and thereby a luminous range to be gradation-compressed is extended on the high luminous side, as shown by the dotted line in FIG. 13, to improve the reproducibility of a high luminous part.

In the conventional video camera where the compression starting point is set at ST1. of FIG. 13, the input signal of 100% to 300% is converted into the output signal of 100% to 120% under a condition of a compression rate of 1/10. On the contrary, in the present invention where the compression starting point is shifted at ST2, the input signal of 80% to 480% is converted into the output signal of 80% to 120% under the condition of the compression rate of 1/10. As a result, the gradation range of a high luminance part is largely improved in the present invention.

Figure 6:
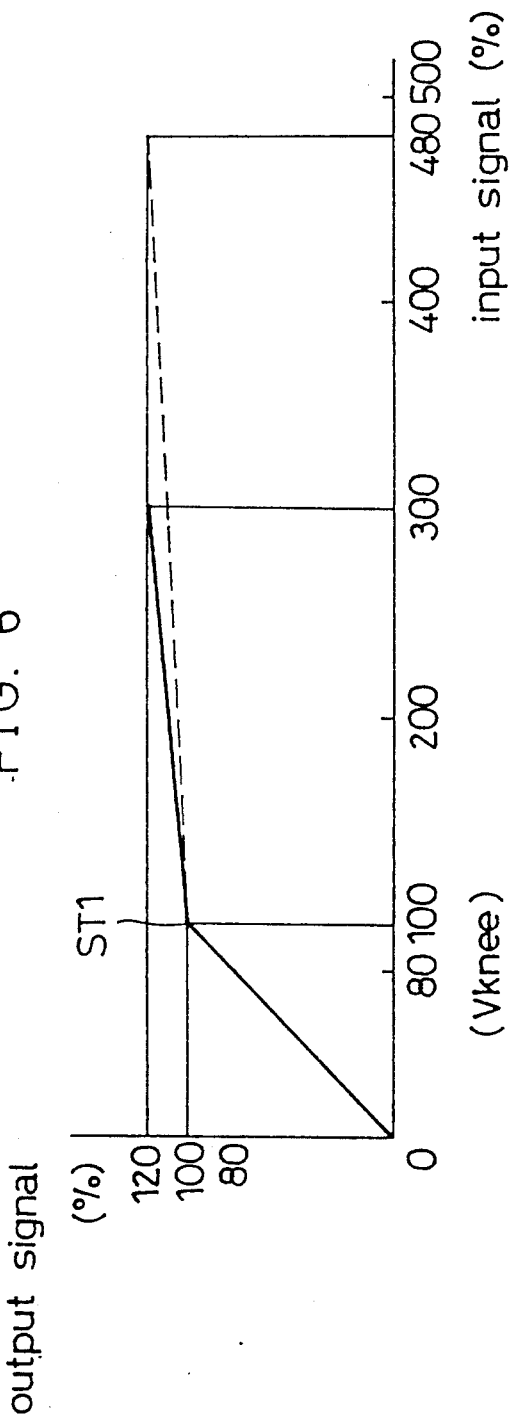
FIG. 6 shows a characteristic of the knee correction according to the present invention.

Moreover, the gradation compression rate may be changeable according to the difference between an average luminance of an entire image plane and an average luminance signals of the lower center of the image plane as well as the knee correction starting voltage is changeable according to the above difference. As shown in FIG. 6, the gradation compression rate can be changed by changing a resistance value of a resistor with respect to a compression rate according to the amount of a difference between an average luminance of the above two parts. The reproducibility of a high luminance part is also improved by thus making the gradation compression rate changeable. By making the gradation compression rate changeable in addition to changing the knee correction starting voltage, the reproducibility of the high luminance part can be further improved.

Next, the non-linear correction circuit 19 will be explained.

The non-linear correction circuit 19 has the input-/output characteristics as shown in FIG. 4 and restrain a maximum value of an output signal intensity. It increases the amplification of an input signal having a signal level of a predetermined signal level range (40-90), sets the amplification low with respect to an input signal having a signal level lower than the lower limit E1 of the signal level in the above range, and clips an input signal having a signal level higher than the upper limit of the above range. An example of the circuit 19 is shown in FIG. 5.

The detection circuit 20 averages an output signal of the non-linear correction circuit 19, and output an average detection voltage Vav of an entire image plane. The average detection voltage Vav is sent to the iris driving circuit 21, and thereby the iris 3 is controlled so that the average detection voltage Vav takes a predetermined value.

According to the output characteristic of the above non-linear correction circuit 19, the above average voltage slightly changes with respect to the change of a luminance of a bright and a dark parts of an image plane. However, when a luminance of the part of an intermediate level (i.e. the predetermined signal level range) changes, the above average voltage delicately responds to the change to control the iris 3 so as to always stop at an optimal picture element operation point. That is, even if a minute area of a high light portion exists on an image plane, it never happens that the iris 3 is closed under the influence of such condition to unintentionally make the entire image plane darker. Moreover, since the highest possible operation point can be given to a CCD with respect to a subject having a low contrast, an image having an excellent signal/-noise (hereinafter referred to as S/N) ratio is always obtained. The color of the human skin belongs to the above intermediate signal level range, and the signal representing the color of the hair belongs to the range of a level lower than that of the above range. Therefore, according to the present invention, in shooting a picture of a person, while the iris 3 delicately responds to a change of the color of the skin, it hardly responds to a change of the color depth of the hair. Because of this, the color of the human skin which the human eye recognizes the most is beautifully reproduced.

A more detailed explanation will hereinafter be given In FIG. 5, when the input voltage Vin to be inputted into the non-linear correction circuit 19 is smaller than Ei, since the transistors $Q_1$ and $Q_3$ are ON and the transistor $Q_2$ is OFF, the collector voltage $V_M$ of the transistor $Q_4$ is given by the following formula:

$$V_M = Vcc - [(E_2 - 0.6)/R_3 - (Vin - E_2)/R_1 - (E_1 - E_2)/R_2]R_4$$
$$= Vcc - (R_4/R_1)Vin + Co$$
(Co is a constant)

On the other hand, when $Vin \geq E_1$, since the transistors $Q_1$ and $Q_2$ are ON and the transistor $Q_3$ is OFF, the collector voltage $V_M$ of the transistor $Q_4$ is given by the following formula:

$$V_M = Vcc - [(E_2 - 0.6)/R_3 - (Vin - E_2) \times (1/R_1 + 1/R_2)]R_4$$
$$= Vcc - C_1(R_4/R_1 + R_4/R_2) \times Vin + C_2$$
($C_1$ and $C_2$ are constants)

The output voltage $V_{out}$ of the non-liner circuit 19 is given by the following formula:

$$V_{out} = V_M + 0.6 \quad (V_M < E_s)$$
$$V_{out} = V_s \quad (V_M \leq E_s)$$

In the characteristic in FIG. 4, the output of the image taking device is assumed to be 100%. For example, when a dynamic range of a CCD is 600 mV, the output is set to 200 mV which is equivalent to the amount of the 100% so that a reproduction of a high light portion does not deteriorate. In the example shown in FIG. 4, a gain for an input of up to 40% is fixed to be 1; that for an input of 40% to 90%, approximately 3.8, and the output level is fixed at 224 mV with respect to an input of 90% or more. When the image sensor output to white color with a reflection factor of 83% is adjusted to be 100% in shooting a gray scale chart with a gradation ratio of 40:1, a gamma of 0.45, and an average reflection factor of 24%, the output of the image taking device in a case where a chart with an entire image plane of a single color is shot is 24% according to a conventional average detection method. On the contrary, according to the present invention, when a chart with an entire image plane of a single color is shot under the above-described condition, the image sensor output is 40%; the S/N ratio improves by approximately 4 dB.

Figure 14:
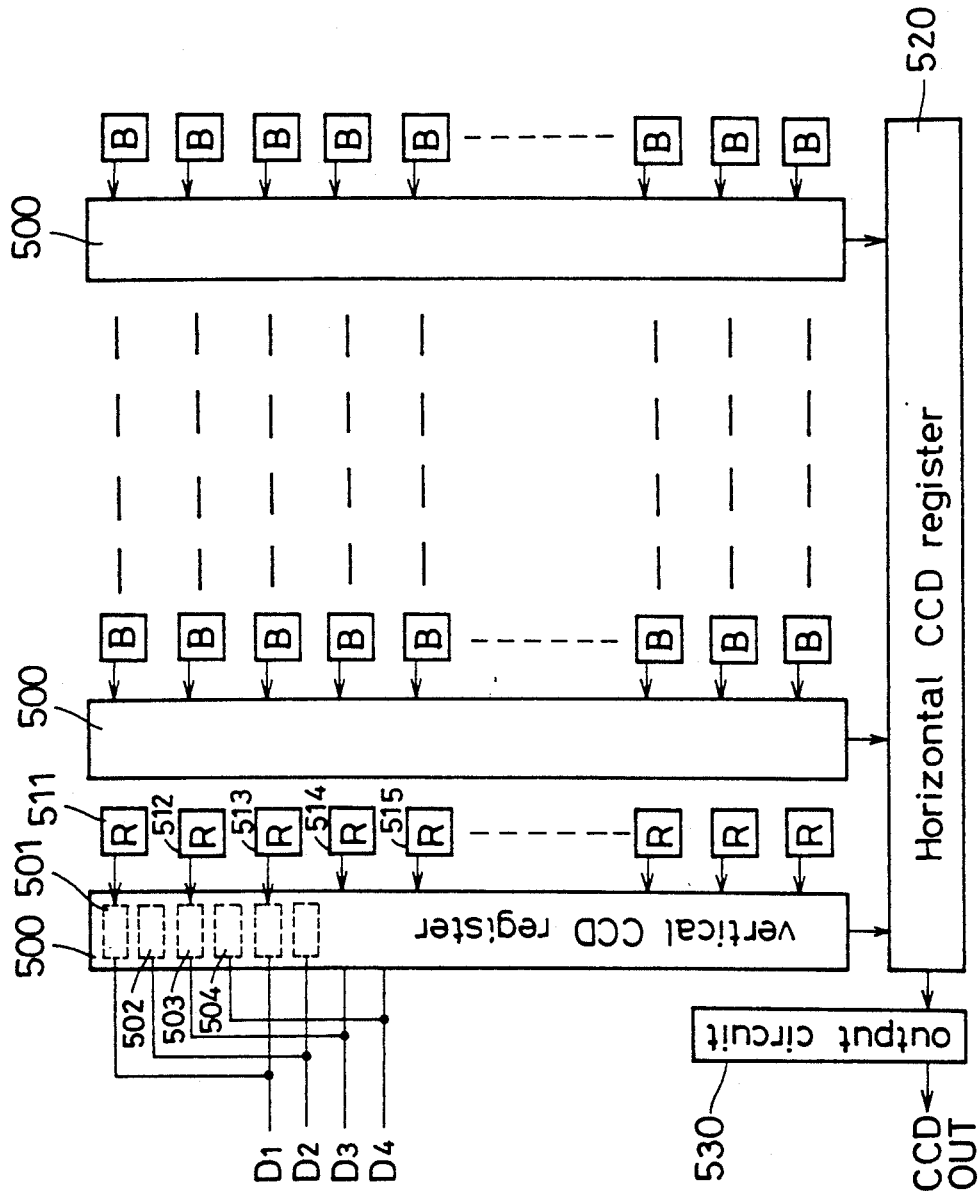
FIG. 14 is a diagram showing an arrangement of a charge coupled device (CCD).

An arrangement of the R/B-CCD7 is shown in FIG. 14. Here, each light receiving unit of the CCD will be called a picture element. A vertical CCD register 500 is arranged in a longitudinal direction of the arrangement of the picture element. The vertical CCD register 500 is a parallel-in-serial-out type register, where two memory elements correspond to each picture element, and each memory element 501, 502, 503, and 504 is connected to electrodes D1, D2, D3 and D4 in sequence and is driven by three-phase clocks $V_H$, $V_M$ and $V_L$ shown in FIG. 15. There are two methods to derive a video signal out of CCD: a field accumulation mode and a frame accumulation mode. In this embodiment, these two modes are changed by a signal generated by the calculation circuit 26 to derive a signal out of CCD.

Figure 15:
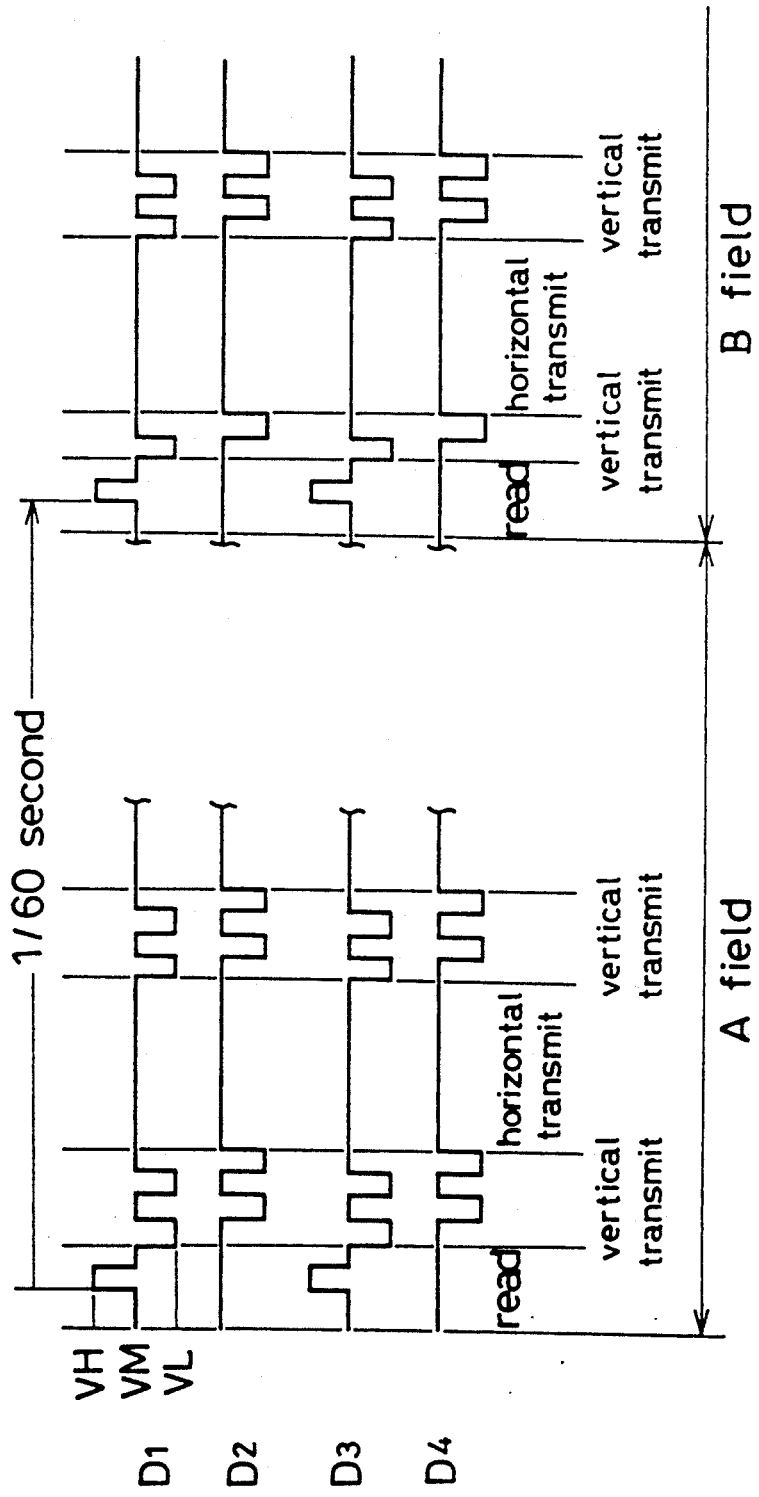
FIG. 15 is a diagram of a control signal for the CCD in a field accumulation mode.
Figure 17:
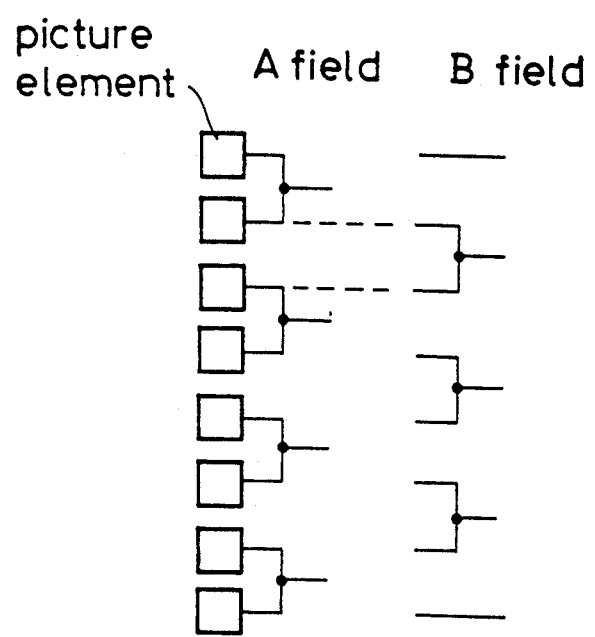
FIG. 17 is a diagram explaining the field accumulation mode.

Firstly, the operation of the field accumulation mode will be explained. Control signals which are coupled to the electrodes D1, D2, D3 and D4 are shown in FIG. 15. First, at an A field, a high-level signal $V_H$ is coupled to the electrodes D1 and D3 of the register 500, and the vertical CCD register 500 reads an accumulation electric charge of all the picture elements of the CCD all at once. Thereafter, a low-level signal $V_L$ is coupled twice alternatively to the four electrode D1, D2, D3 and D4, respectively, and the electric charge read by the vertical CCD register 500 is transmitted by two picture elements to a lower direction in FIG. 14 (vertical transmission). The electric charges corresponding to two picture elements transmitted to a lower end of each vertical CCD register in every vertical transmission are added and transmitted to a horizontal CCD register 520. The horizontal CCD register 520 outputs an electric charge (or a picture element signal) from the left side in FIG. 14 during a horizontal scanning time. The added data with respect to the two vertically adjacent picture elements (shown in FIG. 17) are thus transmitted to an output circuit 530 as data for a scanning line. Thereafter, the data with respect to every horizontal scanning line are transmitted to the output circuit in sequence in the same manner. After all the video signals for the A field have been transmitted, a high level signal $V_H$ is again coupled to the electrodes D1 and D3 of the register 500, and an accumulation electric charge of the entire CCD is simultaneously read-out by the vertical CCD register 500. After that, a low level signal $V_L$ is supplied once alternatively to the four electrodes D1, D2, D3 and D4, respectively. The electric charge read-out by the vertical CCD register 500 is transmitted in sequence to a lower part in the drawing. The electric charge corresponding to one picture element on the lowest part of the vertical CCD resistor 500 is transmitted to the horizontal CCD register 520, and the horizontal register 520 outputs the received electric charge (or a picture element signal) in sequence from the left in the drawing. In the second horizontal scanning line, a low level signal $V_L$ is coupled twice alternatively to the four electrodes D1, D2, D3 and D4, respectively; the electric charge read-out by the vertical CCD register 500, to a lower part in the drawing (vertical transmission); and the added electric charge corresponding to two picture elements on the lower part of the vertical CCD register 500, to the horizontal CCD register 520. The horizontal CCD register 520 outputs the received electric charge (or a picture element signal) in sequence from the left in the drawing. That is, as shown in FIG. 17, the horizontal CCD register 520 transmits the added data corresponding to two picture elements vertically adjoining in a combination different from that of the A field to the output circuit 530 as data for a scanning line. After that, the horizontal CCD register 520 transmits the data with respect to every horizontal scanning line to the output circuit 530 in sequence in the same manner.

Figure 16:
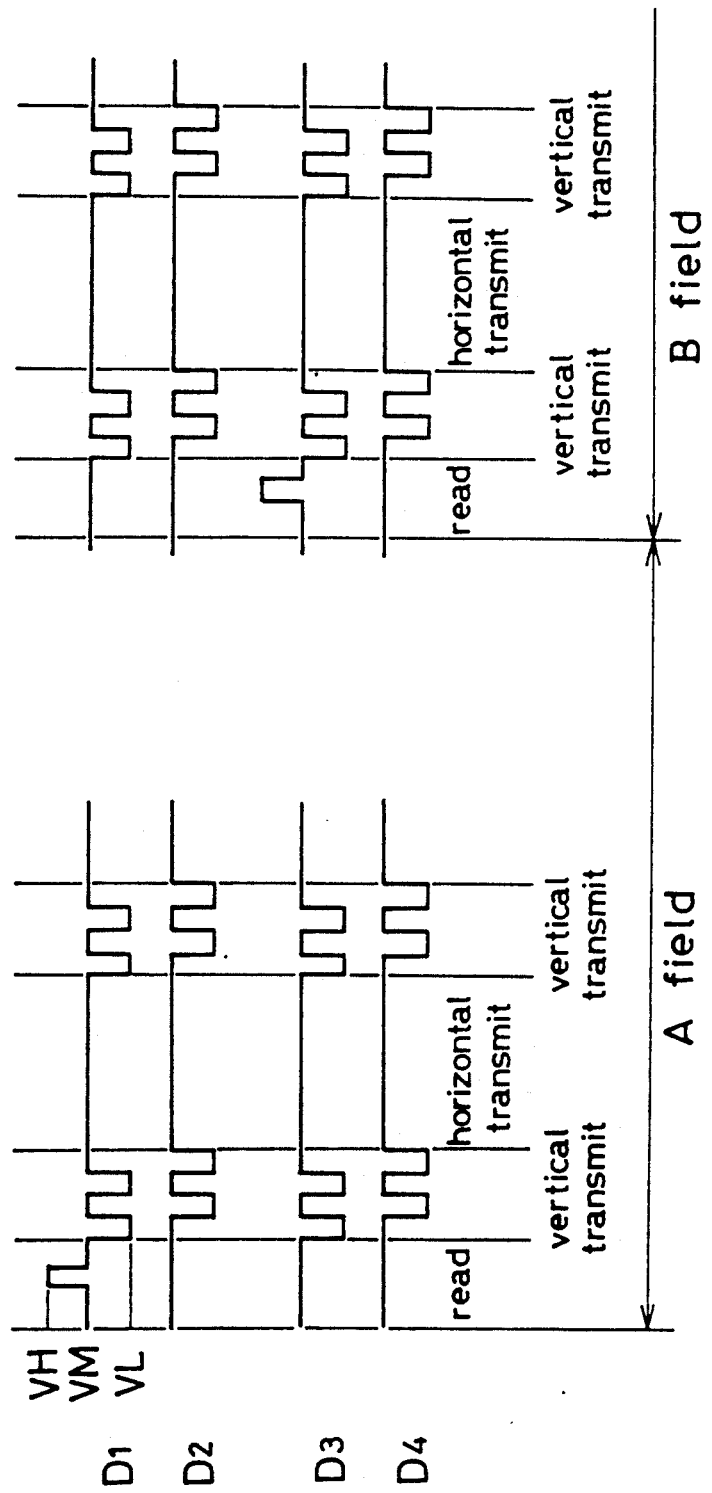
FIG. 16 is a diagram of a control signal for the CCD in a frame accumulation mode.

Next, the operation of the frame accumulation mode will be explained. FIG. 16 shows the control signals coupled to four electrodes D1, D2, D3 and D4. First, at an A field, a high level electrode $V_H$ is coupled to the electrode D1 of the register 500, and an accumulation electric charge in CCD picture element rows on the scanning lines in odd lines is simultaneously read-out by each vertical CCD register 500. After that, a low level signal $V_L$ is coupled twice alternatively to the four electrodes D1, D2, D3 and D4, respectively, the electric charge read by the vertical CCD register is transmitted in sequence to a lower part in the drawing (vertical transmission), and the electric charge corresponding to one picture element in the register on the lower part of the vertical CCD register is transmitted to the horizontal CCD register 520. The horizontal CCD register 520 outputs the received charge (or picture element signals) in sequence from the left in the drawing. That is, the data with respect to a horizontal scanning line in an odd line is transmitted to the output circuit. After that, in the same manner as described above, the data with respect to each horizontal scanning line is transmitted to the output circuit 530. After all the video signals with respect to the A field have been transmitted, a high level signal $V_H$ is coupled to the electrode D3 of the register 500, and the accumulation electric charge of CCD picture elements on the scanning lines in even lines is read-out by the vertical CCD register 500 all at once. After that, a low level signal $V_L$ is coupled twice alternatively to the four electrodes D1, D2, D3 and D4, respectively, an electric charge read by the vertical CCD register 500 is transmitted in sequence to a lower part in the drawing (vertical transmission), and an electric charge with respect to one picture element on the lowest part of the vertical CCD register 500 is transmitted to the horizontal CCD register 520. The horizontal CCD register outputs the received signals (or picture element signals) in sequence from the left in the drawing. That is, the horizontal CCD register 520 transmits the data with respect to a horizontal scanning line in an even line to the output circuit 530. After that, the data with respect to a horizontal scanning line in an even line are transmitted in sequence to the output circuit 530 in the same manner. After all the video signals at the B field have been transmitted, the video signals at the A field are transmitted again, and the video signals are transmitted in the same manner as described above.

Lastly, the operation of the calculation circuit 26 which is a control circuit will be explained with reference to FIG. 18. In this embodiment, to realize an excellent image reproduction regardless of a width of a dynamic range, a scanning mode of the CCD image sensor is changed based on a dynamic range of the brightness of a taking field. First, the average detection voltage Vav of an entire image plane and the average detection voltage Va of the lower center of the image plane of a video signal are inputted into the calculation circuit 26 (#1). Then, the difference $\Delta E = Vav - Va$ between the above detection voltages Vav and Va is calculated in the calculation circuit 26 (#2), and whether the calculation result ($\Delta E$) exceeds a predetermined amount or not is determined by the calculation circuit (#3). When the difference $\Delta E$ between the detection voltages Vav and Va is small, since the luminance difference in the entire image plane is small and the image can adequately be reproduced with a narrow dynamic range, the mode of the CCD driving circuit 27 is set to the frame accumulation mode with an excellent vertical resolution (#4), and thereafter the operation returns to the step (#1). When the difference $\Delta E$ between the detection voltages Vav and Va is not small, since the luminous difference is large in the entire image plane and a wide dynamic range is required, the mode of the CCD driving circuit 27 is changed to the field accumulation mode where a wide dynamic range is obtained. In addition, since the larger difference $\Delta E$ means that the luminance level of the lower center where a subject is situated is low, an iris correction signal $Vcomp = k \cdot \Delta E$ (k is a constant) is sent to the adder 29. Then, the iris driving circuit 21 opens the iris 3 (#5), and waits for 0.5 seconds (#6), which is enough time for the iris 3 to open to its opened end. Next, an average detection voltage Vav' of an entire image plane and an average detection voltage Va' of the lower center of the image plane are inputted (#7). The difference $\Delta E' = Vav' - Va'$ of the above detection voltages Vav' and Va' is calculated (#8), and the calculation result $\Delta E'$ is compared with the $\Delta E$ obtained in the first place. When $\Delta E'$ is larger than $\Delta E$, since it is judged that the iris opens to its opened end in the above-described step (#5) (for the 0.5-second waiting time in the step (#6), it is possible to open the iris to its opened end), a correction signal $\Delta Eagc = vav - Va$ is supplied to the AGC circuit 10 (step #10) to increase the amplification of the AGC circuit 10. When $\Delta E'$ is smaller than $\Delta E$, or after the operation in the step (#10) have been finished, the correction signal Vped for the pedestal adjusting circuit 13 and the correction signal Vknee for the knee correction circuit 15 are calculated, and the correction signals Vped and Vknee are respectively generated (#12) by the calculation circuit 26. After that, the operation of the calculation circuit 26 returns to the step (#1), and the above-described operation is repeated.

In the above steps (#3) to (#10), by confirming that the sign of the luminance difference $\Delta E$ is positive and $\Delta E$ is adequately large, it is detected that a main subject is against the light. In the case, the iris 3 is driven to open, and after that, the luminance difference is measured again and whether a main subject becomes bright by the iris operation or not is determined. If the iris operation could not make a main subject bright, the sensitivity of the AGC circuit 10 is increased, and therefore it is possible to make a main subject bright with the least deterioration of the S/N ratio.

Further, in this embodiment, a difference of an average luminance of an entire image plane and that of the lower center of the image plane is detected as $\Delta E$; however, a main subject is generally situated in an area from the center to the lower part of an image plane, the adjustment reference of this method is the brightness difference between a main subject and the background; therefore, the above-described adjustment is preformed according to a luminance difference of a main subject and the background, and thereby a balanced image plane is always obtainable.

There is another method in which a luminance difference between the brightest and the darkest parts of an image plane is detected. Since the brightness and the darkest parts are not always in the main part of an image plane an appropriate adjustment of the main part of the image plane cannot be always performed when the luminance difference according to the method is used as the adjustment reference. However, the method should not denied with respect to the application to the present embodiment.

Obviously, many modifications and variations of the present invention are possible in light of the above teachings. It is therefore to be understood that within the scope of the appended claims, the invention may be practiced other than as specifically described.

What is claimed is:

1. A video camera comprising:
   a taking lens;
   image taking means for generating a video signal by receiving a light having passed through said taking lens;
   knee correction means for compressing the video signal having a level higher than a predetermined level generated by said image taking means;
   detection means for detecting a luminance difference between a main subject and a background; and
   control means for changing a compression method of a video signal in said knee correction means according to the luminance difference detected by said detection means.

2. A video camera according to claim 1, wherein said detection means detect a luminance of a lower center of a taken image plane as a luminance of the main subject and detect an average luminance of the taken as a luminance of the background.

3. A video camera according to claim 1, wherein said detection means detect the luminance difference between a bright main subject and a dark background or between a dark main subject and a bright background.

4. A video camera according to claim 1, wherein said image taking means generate video signals of red, green and blue, respectively, and said knee correction means compress said video signals of red, green and blue, respectively.

5. A video camera according to claim 1, wherein said control means change a compression starting point (knee point) of said knee correction means according to the luminance difference detected by said detection means.

6. A video camera according to claim 5, wherein said control means lower the knee point as the luminance difference detected by said detection means increases.

7. A video camera according to claim 1, wherein said control means change a compression rate of said knee correction means according to the luminance difference detected by said detection means.

8. A video camera according to claim 7, wherein said control means increase a compression rate as the luminance difference detected by said detection means increases.

9. A video camera according to claim 1, wherein said knee correction means have a feedback loop and the video signal output from said correction means is input again.

10. A video camera comprising:

a taking lens;

image taking means for generating a video signal by receiving a light having passed through said taking lens;

pedestal adjusting means for adjusting a black level of the video signal generated by said image taking means;

detection means for detecting a luminance difference between a main subject and a background; and control means for changing an adjusting method of the black level by said pedestal adjusting means according to the luminance difference detected by said detection means.

11. A video camera according to claim 10, wherein said detection means detect a luminance of a lower center of a taken image plane as a luminance of the main subject and detect an average luminance of the taken image plane as a luminance of the background.

12. A video camera according to claim 10, wherein said detection means detect the luminance difference between a bright main subject and a dark background or between a dark main subject and a bright background.

13. A video camera according to claim 10, wherein said image taking means generate video signals of red, green and blue, respectively, and said pedestal adjusting means compress video signals of red, green and blue, respectively.

14. A video camera according to claim 10, wherein said control means change a reference voltage to the black level of said pedestal adjusting means according to the luminance difference detected by said detection means.

15. A video camera according to claim 14, wherein said control means increase the reference voltage to the black level as the luminance difference detected by said detection means increases.

* * * * *

UNITED STATES PATENT AND TRADEMARK OFFICE
CERTIFICATE OF CORRECTION

PATENT NO. : 5,221,963
DATED : June 22, 1993
INVENTOR(S) : Nobuo Hashimoto, et al It is certified that error appears in the above-indentified patent and that said Letters Patent is hereby corrected as shown below:

In Col. 7, line 49, after "reduced", insert --by--.

In Col. 8, line 54, change "A2=R4/R3" to --A2=-R4/R3--.

In Col. 9, line 63, change "output" to --outputs--.

In Col. 10, line 57, change "$E_.$" to --$E_3$--.

In Col. 10, line 58, change "$V_.$" to --$V_3$--, and change "$E_.$" to --$E_3$--.

In Col. 13, line 57, change "the case" to --this case--.

In Col. 14, line 10, change "brightness" to --brightest--.

In Col. 14, line 16, after "not", insert --be--.

In Col. 14, line 41 (Claim 2, line 4), after "taken", insert --image--.

Signed and Sealed this

Twenty-ninth Day of March, 1994

Attest:

BRUCE LEHMAN

*Attesting Officer*　　　　*Commissioner of Patents and Trademarks*